(12) United States Patent
Dane et al.

(10) Patent No.: US 12,223,773 B2
(45) Date of Patent: Feb. 11, 2025

(54) METHOD FOR ANALYZING THE MOVEMENTS OF A PERSON, AND DEVICE FOR IMPLEMENTING SAME

(71) Applicant: A.I.O., Pessac (FR)

(72) Inventors: Cyril Dane, Talence (FR); Florian Boudinet, Pessac (FR)

(73) Assignee: A.I.O., Pessac (FR)

( * ) Notice: Subject to any disclaimer, the term of this patent is extended or adjusted under 35 U.S.C. 154(b) by 944 days.

(21) Appl. No.: 17/285,701

(22) PCT Filed: Oct. 17, 2019

(86) PCT No.: PCT/EP2019/078244
§ 371 (c)(1),
(2) Date: Nov. 23, 2021

(87) PCT Pub. No.: WO2020/079163
PCT Pub. Date: Apr. 23, 2020

(65) Prior Publication Data
US 2022/0092299 A1    Mar. 24, 2022

(30) Foreign Application Priority Data
Oct. 18, 2018   (FR) .................................. 1859634

(51) Int. Cl.
*G06T 7/246* (2017.01)
*G06T 7/10* (2017.01)
*G06V 40/20* (2022.01)

(52) U.S. Cl.
CPC ............. *G06V 40/23* (2022.01); *G06T 7/10* (2017.01); *G06T 7/246* (2017.01); *G06T 2207/20084* (2013.01); *G06T 2207/30196* (2013.01)

(58) Field of Classification Search
None
See application file for complete search history.

(56) References Cited

U.S. PATENT DOCUMENTS 6,308,156 B1 * 10/2001 Barry ...................... G10L 13/07
704/254
7,333,967 B1 * 2/2008 Bringsjord ............... G06N 5/00
706/45

(Continued)

FOREIGN PATENT DOCUMENTS

JP         3565387 B2   9/2004

OTHER PUBLICATIONS

French Search Report; priority document.

(Continued)

*Primary Examiner* — Tsung Yin Tsai
(74) *Attorney, Agent, or Firm* — Greer, Burns & Crain, Ltd.

(57) ABSTRACT

A method for analyzing at least one sequence of movements performed by a person, including steps of segmenting the sequence of movements into time units, each associated with a time (t0 to tn), determining for each instant, positions of at least some characteristic points of the person using an acquisition system providing raw data, assigning at each instance at least one position code for the characteristic points as a function for each of them of the determined position to form a combination of position codes at each instant, assigning at least one elementary action code for each given instant corresponding to the combination of position codes at the given instant, and syntactically verifying the elementary action codes and/or position codes from at least one structured language to refine the raw data relating to the positions of the characteristic points.

8 Claims, 5 Drawing Sheets

(56) References Cited

U.S. PATENT DOCUMENTS

| | | | | |
|---|---|---|---|---|
| 8,786,680 | B2* | 7/2014 | Shiratori | G06V 40/23 345/473 |
| 11,070,644 | B1* | 7/2021 | Teng | H04L 67/306 |
| 11,373,331 | B2* | 6/2022 | Huelsdunk | G06V 10/82 |
| 2007/0188472 | A1 | 8/2007 | Ghassabian | |
| 2008/0152191 | A1* | 6/2008 | Fujimura | G06V 40/107 382/103 |
| 2011/0267344 | A1* | 11/2011 | Germann | G06V 20/64 382/154 |
| 2012/0327194 | A1* | 12/2012 | Shiratori | G06F 3/011 348/47 |
| 2013/0271458 | A1* | 10/2013 | Andriluka | G06V 40/23 345/619 |

OTHER PUBLICATIONS

Wang Pichao et al., "RBG-D-based Human Motion Recognition with Deep Learning: A Survey" Computer Vision and Image Understanding, Academic Press, US., vol. 171, May 3, 2018, pp. 118-139.

Wentao Zhu et al., "Co-Occurrence Feature Learning for Skeleton Based Action Recognition Using Regularized Deep LSTM Networks" Proceedings of the thirtieth AAAI Conference on Artificial Intelligence, Mar. 24, 2016, pp. 3697-3701.

Jacopo Cavazza et al., "When Kernel Methods Meet Feature Learning: Log-Covariance Network for Action Recognition from Skeletal Data" Cornell University Library, Aug. 3, 2017.

Abobakr Ahmed et al., "RGB-D Human Posture Analysis for Ergonomie Studies Using Deep Convolutional Neural Network" IEEE International Conference on Systems, Man and Cybernetics, Oct. 5, 2017, pp. 2885-2888.

Weipeng Xu et al., "MonoPerfCap: Human Performance Capture from Monocular Video" Cornell University Library, Aug. 7, 2017, pp. 1-5.

Li Jie et al., "Dynamic Long Short-Term Memory Network for Skeleton-Based Gait Recognition" 2017 IEEE Smartworld, Aug. 4, 2017, pp. 1-6.

Wang Hongsong et al., "Beyond Joints: Learning Representations From Primitive Geometries for Skeleton-Based Action Recognition and Detection" IEEE Transactions on Image Processing, IEEE Service Center, vol. 27, No. 9, Sep. 1, 2018, pp. 4382-4394.

International Search Report; priority document.

* cited by examiner

|     | $t_0$ | $t_1$ | $t_2$ | $t_3$ | $t_4$ | ... | $t_n$ |
|-----|-------|-------|-------|-------|-------|-----|-------|
| $A_0$ | $F_3$ | $F_4 I_8$ | $I_1$ | $F_3$ | $I_8$ | | $I_1$ |
| $A_1$ | $F_5$ | $P_9$ | $P_8$ | $F_5$ | $P_9$ | | $P_8$ |
| $A_2$ | $I_6$ | $RA_4$ | $RA_3$ | $I_6$ | $RA_4$ | | $RA_3$ |
| ⋮ | | | | | | | |
| $A_{13}$ | $R_4$ | $I_7$ | $R_4$ | $R_4$ | $I_7$ | | $R_4$ |

| Ace | $W_4$ | $Y_7$ | $V_5$ | $V_7$ | $\ell_7$ | ... | $R_4$ |

| Mut | G7 | | | G26 | | | |

Fig. 12

| $t_h$ | $A_0$ | $A_1$ | $A_2$ | $A_3$ | $A_4$ | $A_5$ | $A_6$ |
|---|---|---|---|---|---|---|---|
| $A_0$ | 0 | $L_1$ | $L_4$ | $L_5$ | $L_1$ | $L_5$ | $L_6$ |
| $A_1$ | $L_1$ | 0 | $L_2$ | $L_7$ | $L_8$ | $L_9$ | $L_{14}$ |
| $A_2$ | $L_4$ | $L_2$ | 0 | $L_3$ | $L_9$ | $L_{12}$ | $L_{15}$ |
| $A_3$ | $L_5$ | $L_7$ | $L_3$ | 0 | $L_{10}$ | $L_{13}$ | $L_{11}$ |
| $A_4$ | $L_1$ | $L_8$ | $L_9$ | $L_{10}$ | 0 | $L_2$ | $L_7$ |
| $A_5$ | $L_5$ | $L_9$ | $L_{12}$ | $L_{13}$ | $L_2$ | 0 | $L_3$ |
| $A_6$ | $L_6$ | $L_{14}$ | $L_{15}$ | $L_{11}$ | $L_7$ | $L_3$ | 0 |

METHOD FOR ANALYZING THE MOVEMENTS OF A PERSON, AND DEVICE FOR IMPLEMENTING SAME

CROSS-REFERENCES TO RELATED APPLICATIONS

This application claims the benefit of the International Application No. PCT/EP2019/078244, filed on Oct. 17, 2019, and of the French patent application No. 1859634 filed on Oct. 18, 2018, the entire disclosures of which are incorporated herein by way of reference.

FIELD OF THE INVENTION

The present application relates to a method for analyzing the movements of a person and to a device for implementing the same. Depending on the application, the method of the invention may be used to evaluate the strenuousness of work and/or to optimize certain movements at a workstation.

BACKGROUND OF THE INVENTION

Hitherto, the strenuousness of work has been assessed in a subjective manner, in view of certain factors such as:
  the manual handling of heavy loads,
  strenuous postures, defined as forced positions of the articulations, or
  repetitive work, characterized by the repetition of the same movement, at a forced rate, with a specified cycle time.

Enterprises attempting to reduce the strenuousness of work for their employees, for example in order to limit the occurrence of musculoskeletal disorders, have evaluation tools such as questionnaires and scorecards, but no tool for quantifying strenuousness.

Enterprises may engage ergonomists to improve the working conditions of persons at their workstations. The procedure followed by an ergonomist comprises a first phase of observing the workstation, a second phase of analysis based on ergonomic scorecards, and a third step of drawing up recommendations, which are usually a compromise between the ergonomist's analysis and the different viewpoints of the persons moving at the workstation.

This procedure is not entirely satisfactory, because the first observation phase is relatively lengthy and incomplete. Moreover, since the recommendations drawn up by the ergonomist are based on observations, rather than on precise biomechanical measurements, the quality of his recommendations is highly dependent on his level of expertise.

In the field of sport, augmented reality and animation, there are devices for monitoring a person's movements, which can be used to monitor the movements of different segments of a person moving in a scene. According to a first embodiment, such a device comprises a plurality of cameras arranged so as to cover the scene, and markers carried by the person, which are arranged so as to identify the different segments of the person.

Although the devices of this first embodiment may be used to monitor the different movements of the different segments of a person very precisely, it may be difficult to use them in the context of workstation improvement, for the following reasons:

Because of the high costs of manufacture and use, such devices cannot be deployed in the context of the analysis and improvement of workstations.

Because of the fragility and price of some of their components, these devices are generally used in laboratory-like conditions, which are incompatible with an environment such as a building site in the construction industry.

The intrusive quality of the device, due to the placing of markers on a person, may falsify the measurements.

The equipment preparation and calibration times are relatively long.

According to a second embodiment, originating notably from the video games field, a device for monitoring the movements of a player comprises a movement sensor in the form of a depth camera positioned facing the player, together with software for processing the signal from the camera, configured for identifying the different segments of the player and their movements, for the purpose of representing these different segments in the form of a wireframe avatar. The costs of manufacture and use of devices of this second embodiment are markedly lower than those of the first embodiment, and are therefore compatible with a method of workstation improvement. Furthermore, they do not require the fitting of markers on persons.

Despite these advantages, a movement monitoring device according to the second embodiment cannot be used as such to obtain a reliable dynamic model of a person for the purpose of improving his workstation or reducing strenuousness.

The present invention is intended to overcome all or some of the drawbacks of the prior art.

SUMMARY OF THE INVENTION

To this end, the invention relates to a method for analyzing at least one sequence of movements performed by a person having a set of characteristic points, each movement comprising a succession of elementary actions. The method comprises a step of observing the sequence of movements by means of at least one acquisition system configured for supplying raw data relating to the positions of at least some characteristic points of the set of characteristic points.

According to the invention, the method comprises:
  a step of segmenting the sequence of movements into time units, each associated with an instant,
  a step of determining, for each instant, positions of at least some characteristic points of the set of characteristic points, using the acquisition system,
  a step of assigning, at each instant, at least one position code for at least some characteristic points of the set of characteristic points, on the basis, for each of them, of the determined position, so as to obtain a combination of position codes at each instant,
  a step of assigning at least one elementary action code for each given instant, corresponding to the combination of position codes at the given instant, and
  a step of syntactically verifying the elementary action codes and/or position codes on the basis of at least one structured language which has at least one rule and at least one lexicon, in order to refine the raw data relating to the positions of the characteristic points.

This solution enables reliable and precise monitoring of a person's movements to be obtained on the basis of raw data.

BRIEF DESCRIPTION OF THE DRAWINGS

Other characteristics and advantages will be apparent from the following description of the invention, this description being provided solely by way of example, with reference to the attached drawings, in which:

FIG. 12 is a table showing the distances between the articulations at a given instant.

DETAILED DESCRIPTION OF THE PREFERRED EMBODIMENTS

Figure 9:
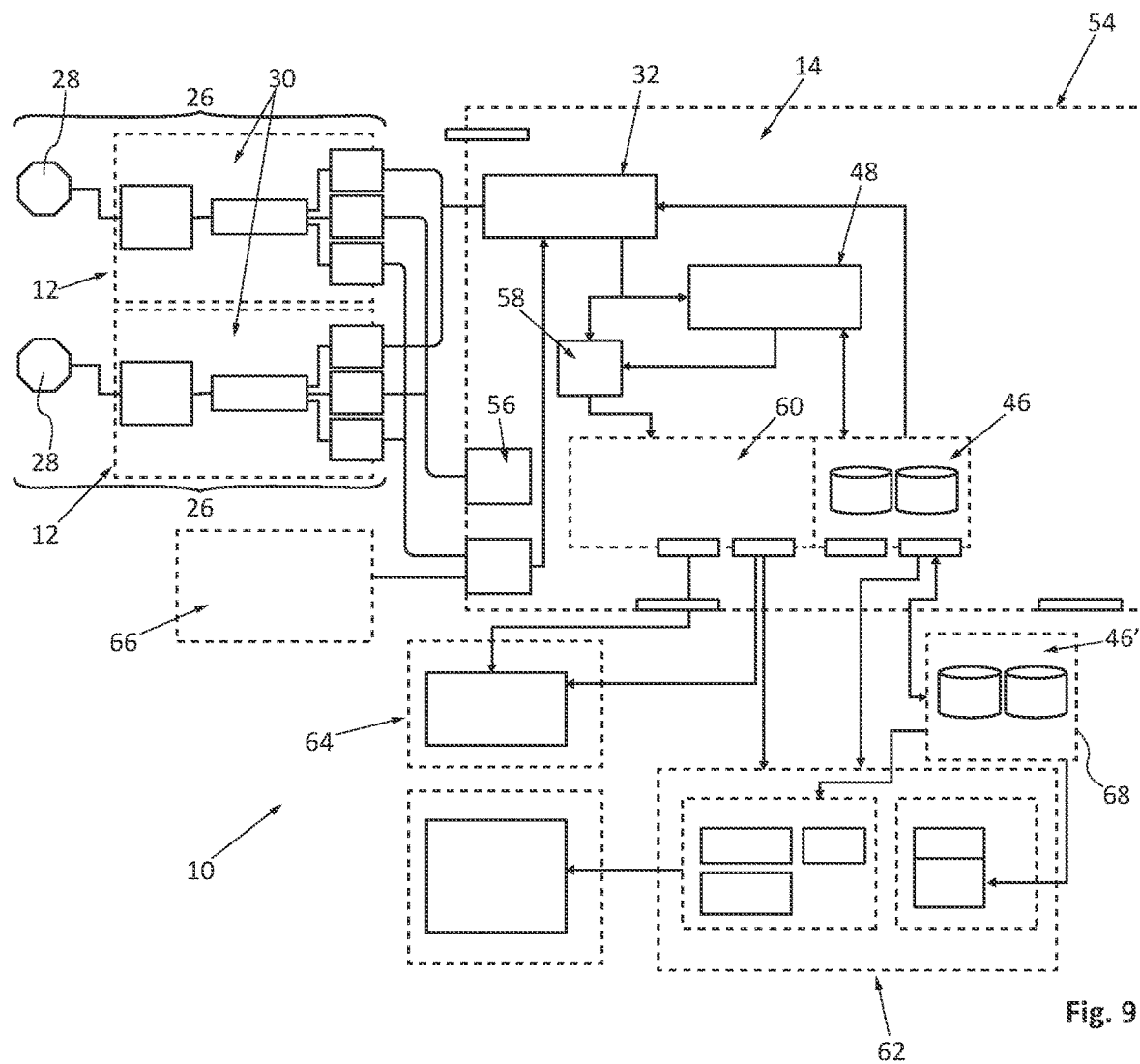
FIG. 9 is a schematic representation of a device for monitoring a person's movements, illustrating an embodiment of the invention.

FIG. 9 shows, at 10, a device for analyzing a person's movements, comprising at least an acquisition unit 12 and at least a processing and analysis system 14. According to one application, this device for analyzing a person's movements 10 is configured to obtain a dynamic model of the person. Thus, the analysis of a person's movements is not limited to the analysis of the kinematics of the movements. According to the invention, the analysis of the movements covers the analysis of the kinematics of the movements and the analysis of the forces, powers and/or energies produced and associated with the movements.

Figure 1:
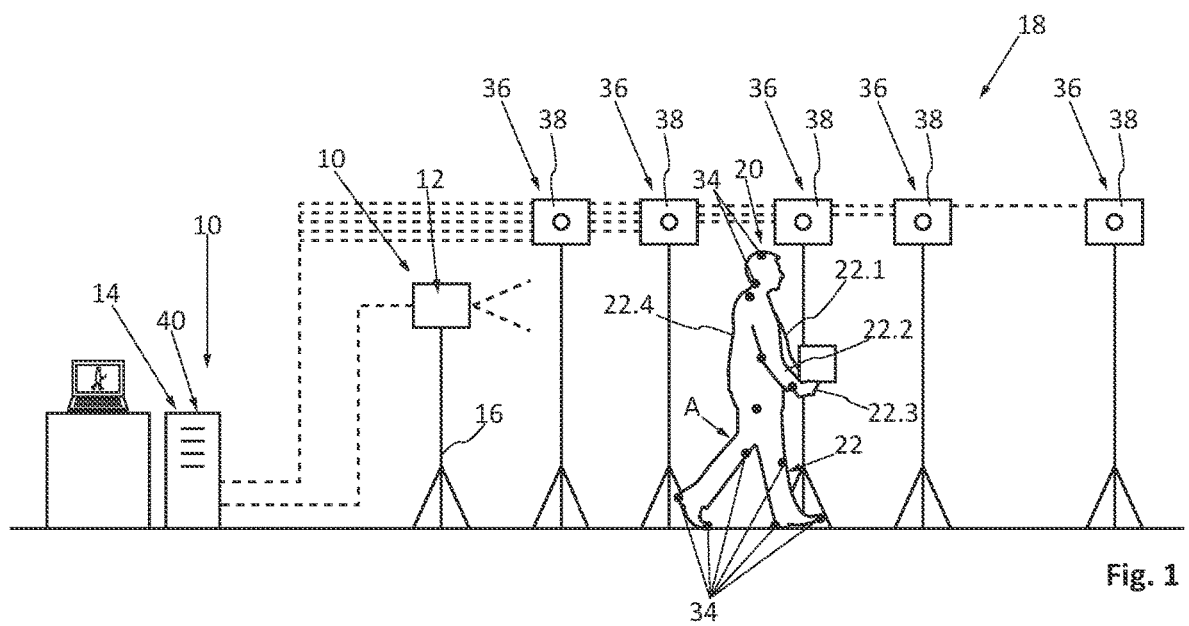
FIG. 1 is a schematic representation of a step of calibrating a device for monitoring a person's movements, which illustrates an embodiment of the invention.
Figure 2:
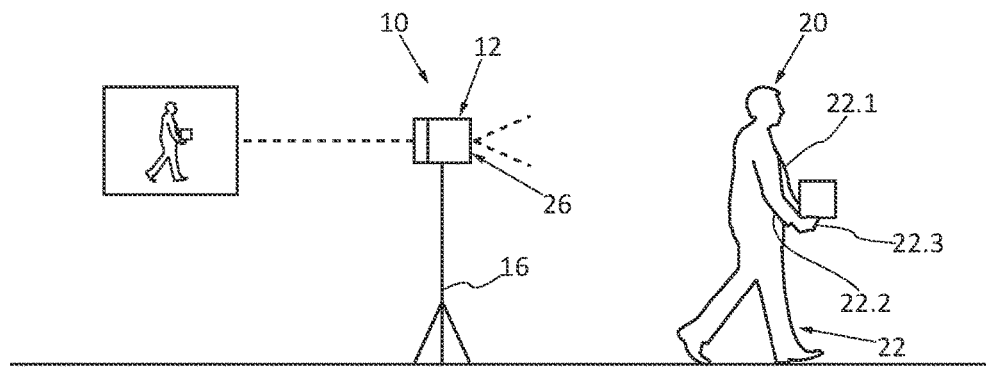
FIG. 2 is a schematic representation of the device for monitoring the movements of a person visible in FIG. 1, after the calibration step.

According to a configuration illustrated in FIGS. 1 and 2, an acquisition unit 12 is supported by a tripod 16. Evidently, the invention is not limited to this arrangement. Regardless of the configuration, each acquisition unit 12 is positioned and oriented so as to view a scene 18 in which at least one person 20 may move.

Figure 4:
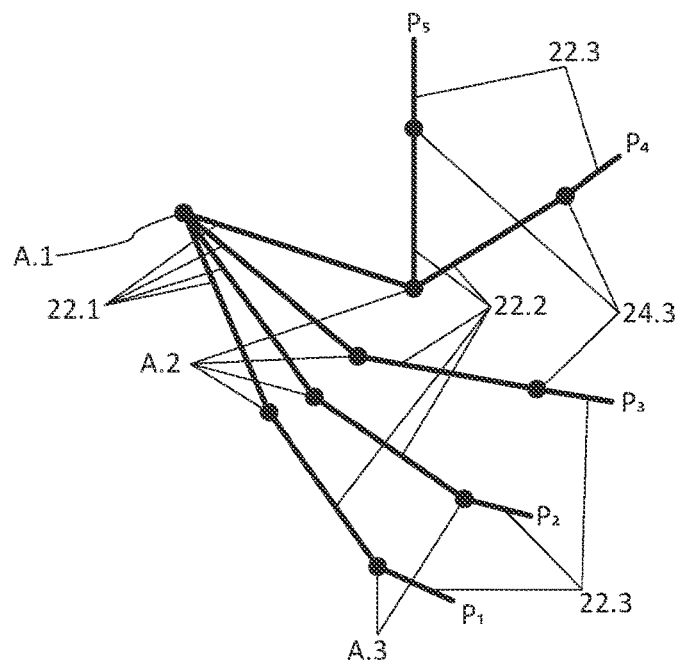
FIG. 4 is a schematic representation of a step of the different real positions of a real movement of a person's forearm.
Figures 10, 11:
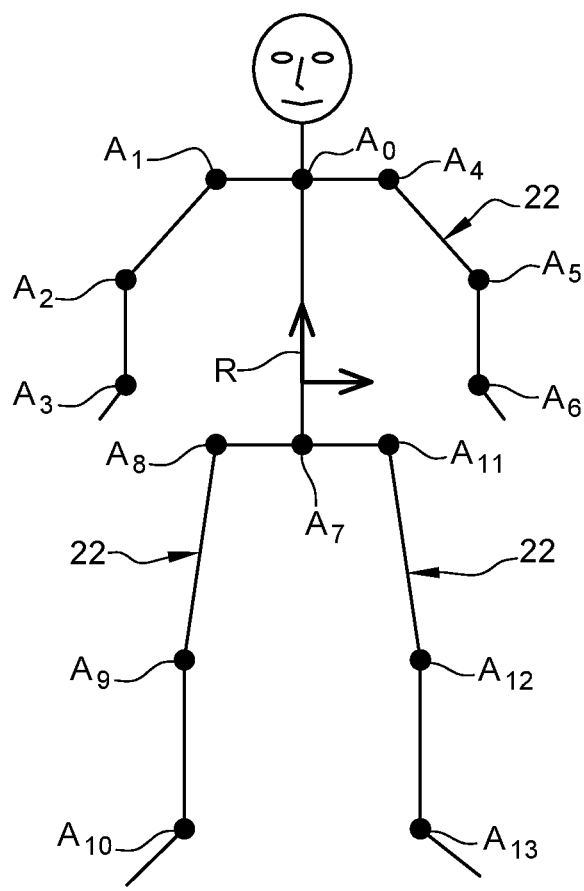
FIG. 10 is a schematic representation of a step of the different articulations of a person.
FIG. 11 is a table showing the states of the different articulations and the elementary movements at different instants, together with the movements performed by a person.

For the remainder of the description, a person 20 (visible in FIG. 2, for example) comprises a plurality of real segments, referenced in a general way by 22 or separately by 22.1, 22.2, 22.3 (as illustrated in FIG. 4), connected by real articulations, referenced in a general way by A or separately by A.0 to A.13 (as illustrated in FIGS. 4 and 10). These real segments 22 correspond to the different parts of his body (trunk, upper right or left arm, right or left forearm, right or left hand, etc.), which are articulated to each other by the real articulations A, which may be links of the ball type (three possible rotations) or the pivot type (one possible rotation).

Each acquisition unit 12 comprises at least one acquisition sensor 26 configured for determining a raw virtual position, in a virtual reference frame, for each of the virtual segments corresponding to at least some of the real segments 22 and/or for each of the virtual articulations corresponding to at least some real articulations A.

According to a non-limiting embodiment, each acquisition sensor 26 comprises an RGB-D depth camera 28 configured for sending a signal on the basis of the captured image stream, together with a controller 30 in which is implemented an image processing software configured for processing the signal from the camera 28 and for deducing therefrom the raw virtual position of each virtual segment and/or each virtual articulation corresponding to the real segments 22 and/or to the real articulations A filmed by the depth camera 28.

The device for analyzing a person's movements 10 may comprise other acquisition sensors 26, such as force or power sensors.

According to one configuration, the acquisition sensor(s) 26 is/are configured for supplying at their output a set of raw data comprising at least some anatomic and/or morphological data on the person (length, weight, center of gravity, etc., of each virtual segment) and/or at least some dynamic data on the person (rotation vector of each pair of real virtual segments, forces, moments applied to each segment, speed at a given point of each segment, etc.).

Figure 8:
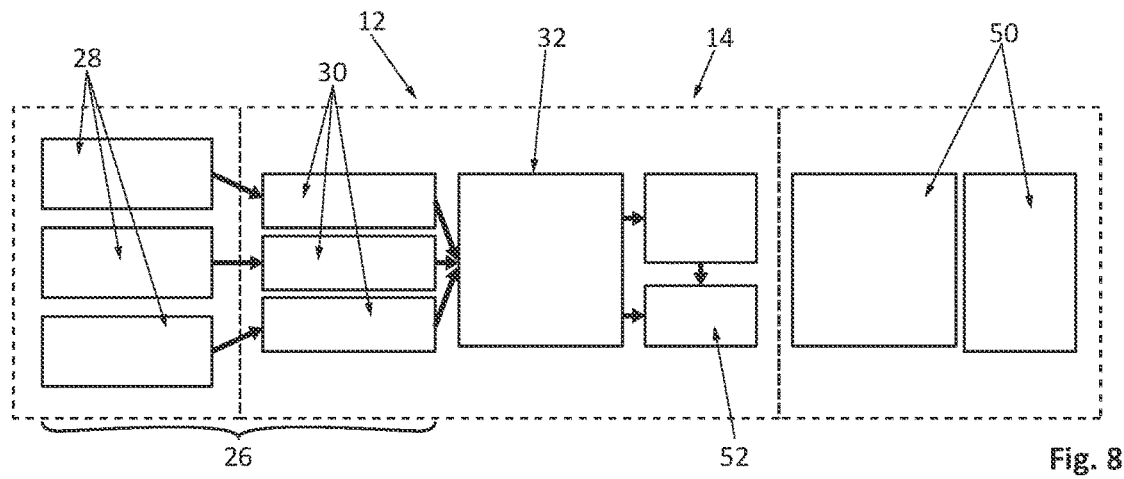
FIG. 8 is a schematic representation of an acquisition unit, illustrating an embodiment of the invention.

According to one embodiment, shown in FIGS. 8 and 9 for example, the device for analyzing a person's movements comprises a plurality of acquisition sensors 26. These acquisition sensors 26 may determine redundant values for some data in the set of raw data. In this case, these redundant values are merged so as to establish a unique value for each raw data element.

The acquisition sensors 26 are not described further, since some of them may be identical to the movement analysis devices of the second embodiment of the prior art.

As in the prior art, the acquisition sensor 26 or the acquisition sensors 26 supply, for each virtual segment and/or each virtual articulation, a less reliable position, called a raw position, which is not satisfactory in the context of a precise analysis of the movements of the real segments and/or the real articulations of a person.

Regardless of the embodiment, the acquisition sensor or sensors 26 is/are configured for determining, on the basis of the observation of a person, a set of raw data that may be used for positioning in a virtual reference frame a set of virtual segments and/or virtual articulations corresponding to the real segments and/or the real articulations of the observed person. The acquisition sensor or sensors 26 is/are configured for determining, on the basis of the observation of a person, a dynamic model of the observed person.

For the remainder of the description, "a sensor or the sensor" is also taken to mean either a single acquisition sensor 26 or a plurality of acquisition sensors 26 that may be used to obtain a set of raw data.

According to one embodiment, the device for analyzing a person's movements 10 comprises a processing module 32 configured for correcting the value of each raw data element measured by the acquisition sensor 26, in order to establish a set of refined data.

The degree of correction of each raw data element is such that the virtual position of each virtual segment and/or of each virtual articulation deduced from the set of refined data is very close to the real position of each real segment and/or each real articulation of the observed person, thus permitting a precise analysis of the movements of the real segments and/or the real articulations of a person.

According to one embodiment of the invention, the processing module 32 comprises at least an artificial neural network 42 having parameters optimized by a learning method.

This artificial neural network 42 comprises a number of inputs or outputs greater than or equal to the number of raw data to be processed.

According to one procedure, the number of raw data is forty-six (46). According to one configuration, the artificial neural network 42 comprises twenty-seven (27) inputs and twenty-seven (27) outputs.

According to one architecture, the artificial neural network 42 comprises one hundred and eighteen (118) neurons, distributed in four (4) layers, twenty-seven (27) at each input or output layer and thirty-two (32) at each intermediate level. The artificial neural network 42 has a similar structure to a variational auto-encoder (VAE) structure.

In a variant, the artificial neural network 42 has a structure of the recurrent long short term memory (LSTM) type.

In a variant, the artificial neural network 42 is of the fully connected type, each neuron in a layer being connected to all the neurons in the layer above.

The artificial neural network 42 usually comprises at least four layers of neurons.

According to one configuration, the artificial neural network 42 comprises at least twenty-seven (27) inputs and twenty-seven (27) outputs.

According to a first configuration, the processing module 32 comprises a single artificial neural network 42 configured for processing all the raw data. According to another configuration, the processing module 32 comprises a plurality of artificial neural networks, each processing different raw data. By way of example, a first network is configured for processing the raw data relating to the rotation vectors, and a second network is configured for processing the data relating to the lengths of the segments.

As illustrated in FIG. 1, the learning method comprises a step of simultaneous observations of a person 20 fitted with markers 34, by a movement analysis device 10 according to the invention and by a reference analysis device 36.

The reference analysis device 36 comprises a plurality of cameras 38 and a processing system 40 configured for establishing a set of reference data Y1 to Yn obtained as a result of the observation of the real segments and/or the real articulations of the person 20. In a variant, the reference analysis device 36 comprises, in addition to the cameras 38, at least one force sensor, for example a force plate.

This reference analysis device 36 is not described further, since it may be identical to one of those of the first embodiment of the prior art. By way of example, the reference analysis device 36 may be a device marketed under the trade name Optitrack, comprising between 8 and 32 cameras, or a device marketed under the trade name Vicon, comprising a force plate.

Figure 3:
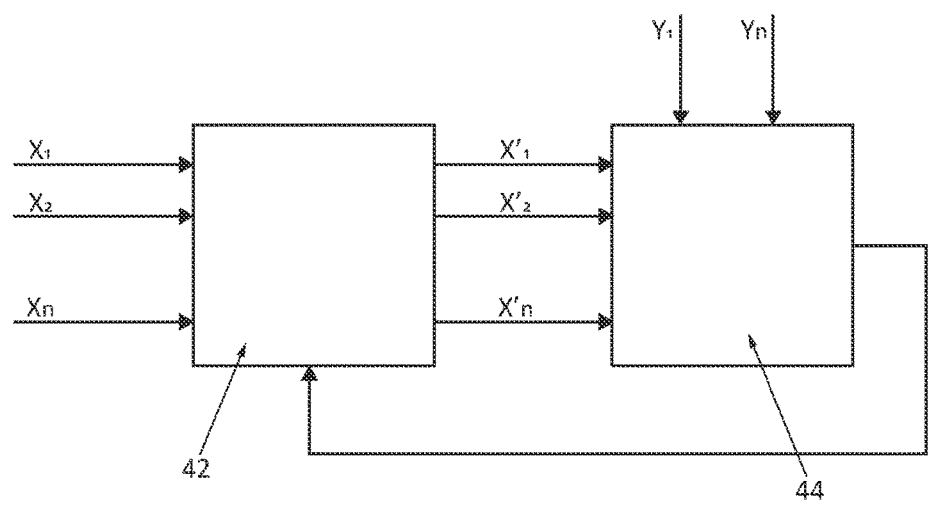
FIG. 3 is a schematic representation of a step of self-learning.

As illustrated in FIG. 3, the raw data X1 to Xn obtained using the movement analysis device 10 are processed by the artificial neural network 42 of the processing module 32 so as to obtain a set of refined data X1' to Xn'. These refined data X1' to Xn' are compared, using a loss function 44, with the reference data Y1 to Yn obtained using the reference analysis device 36. On the basis of this comparison, the parameters of the artificial neural network 42 are modified so as to minimize the difference between the refined data X1' to Xn' and the reference data Y1 to Yn.

The modification of the parameters of the artificial neural network 42 is based on the method of gradient back-propagation with the aim of correcting the weights of the neurons, from the last layer to the first.

As the observations proceed, the processing module 32 becomes increasingly precise, the refined data X1' to Xn' being substantially equal to the reference data Y1 to Yn obtained using the reference analysis device 36.

A number of movement analysis devices 10 may be calibrated simultaneously. For each of them, the raw data X1 to Xn are processed by the artificial neural network 42 of the processing module 32 so as to obtain a set of refined data X1' to Xn', which are compared with the reference data Y1 to Yn.

The movement analysis device 10 according to the invention enables precise monitoring of the segments of a person to be obtained. Since its costs of manufacture and use are markedly lower than those of a reference analysis device 36, the observations can be multiplied and the device according to the invention can be used in environments such as construction sites, for example.

The ability to multiply the observations makes it possible to collect a large number of refined data relating to a multitude of movements of different persons, notably at different workstations.

Thus, it is possible to observe on several occasions the same movement performed several times by different persons (of different builds).

The movement analysis device 10 comprises at least one database 46 which records, for each movement, the different positions of the different segments at the different moments of the movement.

The observations of the same movement performed several times by several persons may be grouped in the database 46 in the form of a family of movements. For the purposes of the present application, a family of movements comprises similar movements, as in the case of the family including movements corresponding to a stationary standing position, the family of movements concerned with picking up an object on the ground, the family of movements of torso rotation, the family of movements of lifting an arm, and so on.

Figure 5:
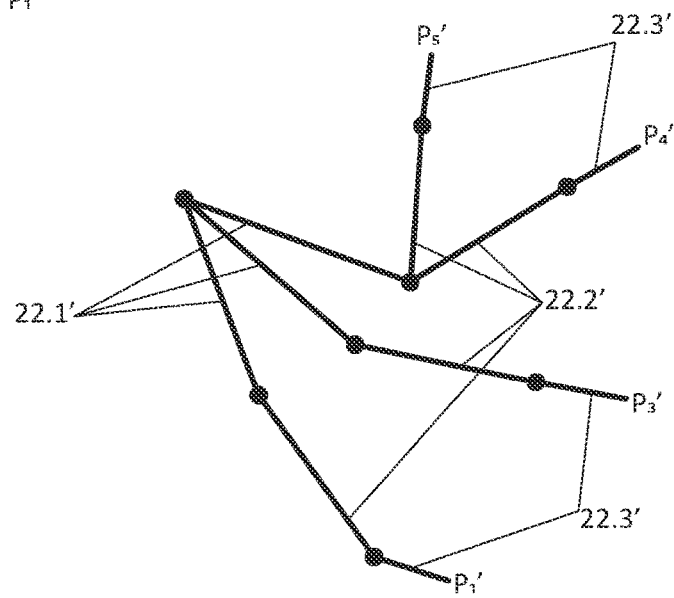
FIG. 5 is a schematic representation of the different virtual positions determined by a movement monitoring device on the basis of the observation of the real movement visible in FIG. 4.

Even if the movement analysis device 10 enables precise measurements to be obtained, these measurements may be affected by noise due to different factors such as blocking phenomena or as a result of angles of vision or the external environment. Thus, as illustrated in FIGS. 4 and 5, movement analysis device 10 can determine, on the basis of a movement of real segments 22.1 to 22.3 comprising a plurality of successive real positions P1 to P5 of the real segments, the virtual positions P1', P3', P4', P5' of the virtual segments 22.1' to 22.3' (corresponding to the real segments 22.1 to 22.3). In this case, the virtual position of the virtual segments corresponding to the position P2 could not be determined.

The movement analysis device 10 comprises a movement analysis module configured for identifying the observed movement.

According to a first embodiment, the movement analysis module is configured for comparing the observed movement with the movements stored in the database 46, and for identifying the family of movements to which it belongs.

According to a first procedure, a method for analyzing a person's movements comprises a step of segmenting a movement determined by the processing module 32 into a succession of elementary actions having equal durations of between 0.25 and 1 s, and a step of translating each elementary action into a character of a writing system.

For this purpose, the analysis device comprises an analysis module 48 configured for segmenting the movement determined by the processing module 32 and translating each segment into a character of a writing system.

Each movement is translated into a succession of characters which, depending on the complexity and/or the length of the movement, forms a syllable, a word or a phrase.

According to another particular feature, each movement determined by the processing module 32 is stored, in the database 46 or another database 46', in the form of a succession of segments, each segment being translated into a character of a writing system. Thus, on the basis of a multitude of observations of a multitude of movements translated in the database 46, 46' in the form of syllables, words or phrases, it is possible to establish a structured written language that has at least one rule, or usually a set of rules (such as grammatical rules, for example) and at least one lexicon.

If it has been impossible to determine at least one elementary action of a movement by the movement analysis device 10, this movement analysis method makes it possible to determine the missing character on the basis of the rules and/or the lexicon of the structured written language, and by following the elementary action of which the determined character is the translation.

Figure 6:
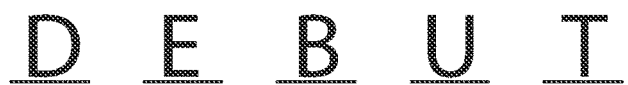
FIG. 6 is a translation of the real movement visible in FIG. 4, in the form of a succession of characters of a writing system.
Figure 7:
FIG. 7 is a translation of the different positions visible in FIG. 5, using the same writing system as that used in FIG. 6.

As illustrated in FIGS. 4 and 6, on the basis of the movement of real segments 22.1 to 22.3 visible in FIG. 4, the analysis module 48 segments the observed movement into a succession of five elementary actions translated by "D"-"E"-"B"-"U"-"T". Thus the movement of raising a hand is translated by the word DEBUT in the structured written language.

As illustrated in FIGS. 5 and 6, if the processing module 32 identifies only the elementary actions 1, 3, 4 and 5 of the movement, as illustrated in FIG. 5, the analysis module 48 translates only the elementary actions 1, 3, 4 and 5 into a "D", a "B", a "U", and a "T" according to structured written language. On the basis of the lexicon of the structured written language, the analysis module 48 deduces that the missing letter is probably an "E", and that the observed movement, translated into DEBUT in the structured written language, corresponds to the movement of raising a hand.

According to another distinctive feature, the fact that each movement is translated into a string of characters may make it possible to compare the character strings with each other in terms of strenuousness, and to assign a degree of strenuousness to each of the character strings on the basis of their classification.

According to a second procedure illustrated in FIGS. 11 and 12, the method for analyzing a person's movements comprises a first step of segmenting at least one sequence of movements into time units t0 to tn, n being an integer. Each time unit t0 to tn has a duration of between 0.25 and 1 s. For the remainder of the description, each time unit t0 to tn is associated with an instant t0 to tn. The sequence of movements comprises at least one movement.

Thus, a sequence of movements Mvt of a person comprises a succession of elementary actions, usually denoted Ace (W4, Y7, V5, . . . ), with one elementary action for each time unit. Thus all the elementary actions have the same duration of between 0.25 and 1 s.

By way of example, a sequence of movements of a walking person comprises the following elementary actions: "raise right leg", "put down right leg", "raise left leg", "put down left leg", and so on.

The method for analyzing a person's movements comprises a step of determining, for each instant t0 to tn, the position of at least some articulations A, the position being determined by the acquisition unit 12. According to one embodiment, the position of each articulation A0 to A13 is determined.

The position of the articulations A0 to A13 is given within at least one reference frame R, preferably linked to the person observed. According to one configuration, a main reference frame R is positioned at the pelvis of the person observed.

According to a first variant, the position of each articulation A0 to A13 is given, at each instant, in spherical coordinates (three angles), on a step by step basis, assuming that the distance between two articulations linked by a single segment is constant. Thus, for a first articulation A7 or A0 linked to the main reference frame R, its position is given in spherical coordinates in the main reference frame R, assuming that the distance A0A7 is constant. For a second articulation A8 (or A11), linked to the first articulation A7, its position is given in spherical coordinates in a secondary reference frame linked to the first articulation A7, assuming that the distance A7A8 (or A7A11) is constant. Similarly, for a second articulation A1 (or A4) linked to the first articulation A0, its position is given in spherical coordinates in a secondary reference frame linked to the first articulation A0, assuming that the distance A0A1 (or A0A4) is constant. For a third articulation A2 (or A5, or A9, or A12), linked respectively to a second articulation A1 (or A4, or A8, or A11), its position is given in spherical coordinates in a third-level reference frame linked to the second articulation A1 (or A4, or A8, or A11). For a fourth articulation A3 (or A6, or A10, or A13), linked respectively to a third articulation A2 (or A5, or A9, or A12), its position is given in spherical coordinates in a fourth-level reference frame linked to the third articulation A2 (or A5, or A9, or A12).

The position of each articulation A0 to A13 comprises at least one angular value. If the articulation has a single degree of freedom, its position comprises a single angular value. If the articulation has two degrees of freedom, its position comprises two angular values, one for each degree of freedom. Finally, if the articulation has three degrees of freedom, its position comprises three angular values, one for each degree of freedom. Thus the position of each articulation comprises one angular value for each degree of freedom of the articulation.

For each degree of freedom of each articulation, the angular value varies over an angular sector bounded by first and second limits. In one embodiment, for each degree of freedom of a given articulation, the first and second limits are the articulation limits of the degree of freedom of the given articulation.

According to a distinctive feature of the invention, each angular sector of each degree of freedom of each articulation is divided into a plurality of ranges of angular values of equal size. According to one embodiment, each range of angular values extends over about 10 degrees at least. According to a preferred, but non-limiting, embodiment, each range of angular values extends over about 10 degrees.

As indicated above, the data relating to the positions of the articulations determined by the acquisition unit 12 are raw, and are refined by the processing module 32 and/or the analysis module 48.

The method for analyzing a person's movements comprises a step of assigning at least one position code for at least some articulations A0 to A13, preferably for each of the articulations A0 to A13, at each instant t0 to tn.

According to one configuration, each degree of freedom of each articulation is associated with at least one letter: F, I, P, RA, etc. Each range of angular values of each degree of freedom of each articulation is associated with a whole number, the numbers associated with the ranges of an angular sector extending from the first limit to the second limit corresponding to the whole number of an arithmetic progression with a common difference of 1.

The position code of an articulation at an instant t comprises at least one pair consisting of at least one letter associated with one number, the letter corresponding to one of the degrees of freedom of the articulation and the number corresponding to the range of angular values to which the angular value of the degree of freedom of the articulation belongs at the instant t. For a given articulation, between two successive instants, the position code comprises only the letter(s) and number pair associated with the degree of freedom whose angular value has varied between the two successive instants.

The method for analyzing a person's movements comprises a step of determining at least one elementary action code at each instant t0 to tn.

According to one configuration, the elementary action code at an instant t comprises at least one pair comprising at least a letter associated with a number.

Each of the combinations of position codes of the different articulations A0 to A13 at a given instant t is associated with an elementary action code at the given instant t.

Thus, by way of example, as illustrated in FIG. 11, a movement Mvt denoted G7 comprises the succession of elementary actions W4, Y7, V5, W4 corresponding to the combination of position codes F3, F5, 16, . . . , R4.

The method for analyzing a person's movements comprises a step of syntactically verifying the elementary action codes in order to refine the raw data relating to the positions of the articulations.

As for the first procedure, on the basis of a multitude of observations of a multitude of movements translated in the form of syllables corresponding to the position codes, words corresponding to the elementary action codes, or phrases corresponding to the movements, it is possible to establish a structured language that has at least one rule, or usually a set of rules (such as grammatical rules, for example) and at least one lexicon.

Because of this structured language, the step of syntactic verification comprises verifying whether the elementary action codes and/or the assigned position codes, deduced from the raw data acquired by the acquisition unit 12, comply with the grammatical rule(s) and the lexicon(s) of the structured languages, and correcting them if necessary.

As before, each rule and each lexicon of the structured language are stored in at least one database 46, 46', and the steps of segmenting, determining the positions of the articulations, assigning position codes, assigning elementary action codes and syntactic verification are executed by the processing module 32 and/or the analysis module 48 forming the artificial neural network 42.

To refine the syntactic verification, the method of analysis may be based on a plurality of structured languages having rules and a lexical field common to all the persons observed and at least one rule and/or at least one element of the lexical field that differ from one observed person to another. Thus, each person observed may be associated with his own structured language, different from the structured language of another person. In this case, the method of analysis comprises a step of selecting the structured language associated with the person observed for the step of syntactic analysis.

According to another variant illustrated in FIG. 12, the data relating to the articulations at each given instant correspond to the distances separating each articulation from the other articulations. By way of example, as illustrated in FIG. 12, the data relating to the articulations A0 to A6 at an instant th are identified. For the sake of simplicity, only the articulations of the upper limbs are identified. Evidently, the invention is not limited to the articulations of the upper limbs, and may be applied to all articulations. Thus, the distance between the articulations A3A5 is shown at the intersection of column A3 and row A5, or at the intersection of column A5 and row A3.

Some distances, for example those between two articulations separated by a single segment, are fixed in time. Other distance, such as those between two articulations separated by at least two segments, vary as a function of time during a movement of the person observed.

Each distance between two articulations varies within a set of values bounded by the first and second limits, which are a function of the morphology of the person observed.

For each pair of articulations, the set of values is divided into a plurality of ranges of values of equal size. According to one embodiment, each range of values extends over about 5 centimeters at least.

As indicated above, the data relating to the distances between the different pairs of articulations are determined by the acquisition unit 12. These data are raw, and must be refined by the processing module 32 and/or the analysis module 48.

According to a preferred embodiment, for each pair of articulations, at each given instant, only the range of values to which the value determined by the acquisition unit 12 belongs is identified. Each range of values is identified by an alphanumeric reference L1 to L15 and/or by a color. In the case of a color, the color code is chosen on the basis of the position of the range of values with respect to the first and second limits, the color code being, for example, increasingly darker as the range of values approaches the first or second limit.

As for the angular values, the method of analysis comprises a step of assigning, at each instant t0 to tn, at least one position code for the different pairs of articulations, as a function of the range of values determined for each of the pairs, so as to form a combination of position codes at each instant t0 to tn; a step of assigning at least one elementary action code for each given instant t0 to tn corresponding to the combination of position codes at the given instant t0 to tn; and a step of syntactically verifying the elementary action codes and/or the position codes on the basis of at least one structured language.

Evidently, the invention is not limited to the articulations. Thus, the method of analysis could be implemented on the basis of other characteristic points of the person observed by an acquisition system, such as the acquisition unit 12 for example, supplying raw data relating to the positions of said characteristic points.

Furthermore, the position code is not limited to a letter and number pair. More generally, the position code assigned at a given instant comprises, for each degree of freedom of each articulation, at least one character (such as a letter and number pair) corresponding to the range of angular values which includes the angular value determined at the given instant for the degree of freedom of the articulation.

Additionally, each position code and/or each elementary action code may be associated with a strenuousness factor for the purpose of deducing therefrom an overall strenuousness factor, based notably on the repetition of the movement Mvt and/or of the elementary action Ace.

In structural terms, each acquisition unit 12 may comprise, in addition to the sensor(s) 26, the processing module 32 and components 50 such as a battery, a cooling system to make the acquisition unit 12 independent, and a communication module 52 to enable the acquisition unit 12 to communicate with other elements such as a server, a remote computer, a tablet or other elements, as illustrated in FIG. 8.

In one embodiment, the processing and analysis modules 32, 48 and the database(s) 46, 46' are integrated into a computer 54. This computer may comprise, among other elements, a control module 56 for controlling each sensor 26, a display module 58, and a communication module 60, to enable the computer to communicate with a network 62 and/or with another device 64 (computer, tablet or similar).

The movement analysis device 10 may comprise at least one attached sensor 66, such as a temperature sensor, or an inertial unit. The signal from each attached sensor 66 may be transmitted to the processing module 32.

At least one of the databases may be stored in a remote server 68.

Evidently, the invention is not limited to the embodiments described above.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for analyzing at least one sequence of movements performed by a person having a set of characteristic points, each movement comprising a succession of elementary actions, said method comprising:
    a step of observing the sequence of movements using at least one acquisition system configured for supplying raw data relating to positions of at least some characteristic points of the set of characteristic points,
    a step of segmenting the sequence of movements into time units, each associated with an instant,
    a step of determining, for each instant, the positions of at least some characteristic points of the set of characteristic points, using the acquisition system, wherein the at least some characteristic points are articulations of the person observed, wherein a position of each articulation comprises an angular value for each degree of freedom of the articulation,
    a step of assigning, at each instant, at least one position code for at least some characteristic points of the set of characteristic points, as a function, for each of them, of the determined position, to form a combination of position codes at each instant;
    a step of assigning at least one elementary action code for each given instant corresponding to the combination of position codes at the given instant; and
    a step of syntactically verifying at least one of the elementary action codes or the position codes based on a plurality of structured languages which has at least one grammatical rule and at least one lexicon common to more than one person observed, and at least one grammatical rule and at least one lexicon that differs from one of the persons observed, by selecting one of the structured languages associated with the person observed, in order to refine the raw data relating to the positions of the characteristic points.

2. The method for analyzing as claimed in claim 1, wherein the elementary actions have equal durations of between 0.25 and 1 s.

3. The method for analyzing as claimed in claim 1, wherein the position of each characteristic point is given in spherical coordinates in at least one reference frame linked to the person.

4. The method for analyzing as claimed in claim 1, wherein the angular value of each articulation varies over an angular sector bounded by first and second limits.

5. The method for analyzing as claimed in claim 4,
    wherein each angular sector is divided into a plurality of ranges of angular values, of equal size, each range extending over about 10 degrees at least, and
    wherein the position code assigned at a given instant comprises, for each degree of freedom of each articulation, at least one character corresponding to the range of angular values which includes the angular value, determined at the given instant, of the degree of freedom of the articulation.

6. The method for analyzing as claimed in claim 4, wherein, for each degree of freedom of each articulation, the first and second limits are articulation limits of the degree of freedom of the articulation.

7. The method for analyzing as claimed in claim 1, wherein the step of syntactic verification comprises verifying whether or not at least one of the elementary action codes or the assigned position codes comply with the at least one grammatical rule and the at least one lexicon of the structured languages, and correcting them if necessary.

8. A device for analyzing at least one sequence of movements performed by a person, for the implementation of the method of analysis as claimed in claim 1, the person having a set of characteristic points, each movement comprising a succession of elementary actions, said analysis device comprising at least an acquisition system configured for supplying raw data relating to positions of at least some characteristic points of the set of characteristic points, wherein the analysis device comprises at least one of a processing module or an analysis module including an artificial neural network configured for executing the steps of segmenting, determining the positions of the articulations based on an angular vector for each degree of freedom of the articulations, assigning position codes, assigning elementary action codes, and syntactic verification, together with at least one database for storing each grammatical rule and each lexicon of the structured language.

* * * * *